United States Patent
Bassani et al.

(10) Patent No.: US 11,281,488 B1
(45) Date of Patent: Mar. 22, 2022

(54) MANAGEMENT OF COMPUTING ENVIRONMENTS WITH VERIFICATION OF COMMAND EFFECTS

(71) Applicant: INTERNATIONAL BUSINESS MACHINES CORPORATION, Armonk, NY (US)

(72) Inventors: Damiano Bassani, Rome (IT); Antonio Di Cocco, Rome (IT); Alfonso D'Aniello, Gragnano (IT); Catia Mecozzi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 16/948,983

(22) Filed: Oct. 8, 2020

(51) Int. Cl.
- *G06F 9/455* (2018.01)
- *G06F 9/50* (2006.01)
- *G06F 9/54* (2006.01)
- *G06F 11/30* (2006.01)

(52) U.S. Cl.
CPC ........ *G06F 9/45558* (2013.01); *G06F 9/5027* (2013.01); *G06F 9/542* (2013.01); *G06F 11/301* (2013.01); *G06F 2009/45587* (2013.01); *G06F 2009/45591* (2013.01); *G06F 2209/508* (2013.01)

(58) Field of Classification Search
CPC .................................................. G06F 9/45558
See application file for complete search history.

(56) References Cited

U.S. PATENT DOCUMENTS

| | | |
|---|---|---|
| 8,776,028 B1 | 7/2014 | Enakiev |
| 9,521,140 B2 | 12/2016 | Roth |
| 2012/0323853 A1 | 12/2012 | Fries |
| 2015/0261678 A1* | 9/2015 | Gupta ............... G06F 3/067 711/144 |
| 2018/0239688 A1 | 8/2018 | Gupta |
| 2019/0227878 A1 | 7/2019 | Agarwal |
| 2019/0289057 A1 | 9/2019 | Chen |
| 2019/0332524 A1 | 10/2019 | Jayaswal |

FOREIGN PATENT DOCUMENTS

WO    WO-2021016230 A1 *  1/2021  ......... G06F 16/1873

* cited by examiner

*Primary Examiner* — Charlie Sun
(74) *Attorney, Agent, or Firm* — Dmitry Paskalov

(57) ABSTRACT

A solution is proposed for managing a computing environment. A corresponding method comprises detecting critical commands and applying each critical command and possible following commands to the computing environment by maintaining an unchanged image thereof; a command effect of the application of the critical command on the computing environment is verified according to one or more operative parameters thereof, and the application of the critical/following commands is integrated into the computing environment in in response to a positive result of the verification. A computer program and a computer program product for performing the method are also proposed. Moreover, a system for implementing the method is proposed.

20 Claims, 5 Drawing Sheets

MANAGEMENT OF COMPUTING ENVIRONMENTS WITH VERIFICATION OF COMMAND EFFECTS

BACKGROUND

The present disclosure relates to the information technology field. More specifically, this disclosure relates to the management of computing environments.

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Computing environments (such as virtual machines) have become more and more sophisticated in the last years. This makes their management a quite critical task. Indeed, because of the complexity and the interrelations of the software components of the computing environments, it is very difficult to envisage all the consequences of every change applied thereto.

Typically, changes to software products running in the computing environments (such as new service packs, releases or versions thereof) are tested in dedicated test environments before their deployment, so as to verify that they behave correctly. Nevertheless, the installation of these (new) software products onto the computing environments (in their production environments) may cause unexpected problems due to peculiar characteristics of the computing environments or of their operative contexts.

Therefore, it is common practice to take a snapshot of each computing environment before applying any significant change thereto (for example, the installation of a new software product or the removal of an installed software product) when this significant change might impair operation of the computing environment (for example, when relating to an operating system or to a critical software application). The snapshot saves a representation of a status of the computing environment just before the application of the significant change. The snapshot may then be used to restore the status of the computing environment at its taking in case any problem is experienced because of the application of the significant change.

However, this technique is limited to specific situations only. Particularly, the taking of the snapshots may be integrated in installers of the software products (automating the operations required to install, and to remove, them). In this case, whenever an installer is launched on a computing environment it causes the taking of a snapshot thereof before installing/removing the corresponding software product, either automatically or requiring a manual confirmation by a user of the computing environment. Moreover, the snapshots may be taken manually by the user of each computing environment by submitting a corresponding command thereto. In this way, the user may decide to take a snapshot of the computing environment before performing any maintenance operation that is deemed potentially dangerous.

Therefore, the above-mentioned technique is completely ineffective in case of problems caused by changes that are applied to the computing environments in all the other situations. Particularly, this may happen when a significant change is applied to a computing environment without any snapshot thereof being taken beforehand. In any case, this may happen when a problem is caused by actions performed during normal operation of a computing environment. Indeed, some of these actions may have unexpected side effects on the computing environment. For example, problems may be caused by commands that are submitted by error or because of wrong evaluations. Typical situations are when a file necessary for operation of the computing environment is deleted, when a configuration parameter is modified to a wrong value and so on.

In all these situations, operation of the computing environment is compromised. Moreover, in general it is very difficult (if not impossible) to discover the cause of the problem. Therefore, the only possibility is of restoring the computing environment from a last snapshot, if available, or to re-initialize it from scratch otherwise. However, this involves a relatively long downtime of the computing environment and the possible loss of data.

All of the above is particular acute in cloud environments. In this case, cloud services are provided to corresponding users by cloud providers, which provision, configure and release corresponding computing resources upon request (with their actual implementation that is completely opaque to the users). This de-coupling of the cloud services from their implementation provides the illusion of an infinite capacity of the corresponding computing resources and improves their exploitation, especially for high-peak load conditions (by means of economies of scale); moreover, the users are now relived of the management of the computing resources, and they may perform tasks (on a pay-per-use basis) that were not feasible previously because of their cost and complexity (especially for individuals and small companies). In this case, the users may cause problems (involuntary) to computing environments that are virtualized in the cloud environment (for example, virtual machines or containers), up to completely impair their operation and then requiring interventions by the cloud providers.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of verifying the effect of commands in real-time.

Particularly, an embodiment provides a method for managing a computing environment. The method comprises detecting critical commands and applying each critical command and possible following commands to the computing environment by maintaining an unchanged image thereof; a command effect of the application of the critical command on the computing environment is verified according to one or more operative parameters thereof, and the application of the critical/following commands is integrated into the computing environment in in response to a positive result of the verification.

A further aspect provides a computer program for implementing the method.

A further aspect provides a corresponding computer program product.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation). Particularly.

DETAILED DESCRIPTION

With reference in particular to FIG. 1A-FIG. 1D, the general principles are shown of the solution according to an embodiment of the present disclosure.

Figure 1A:
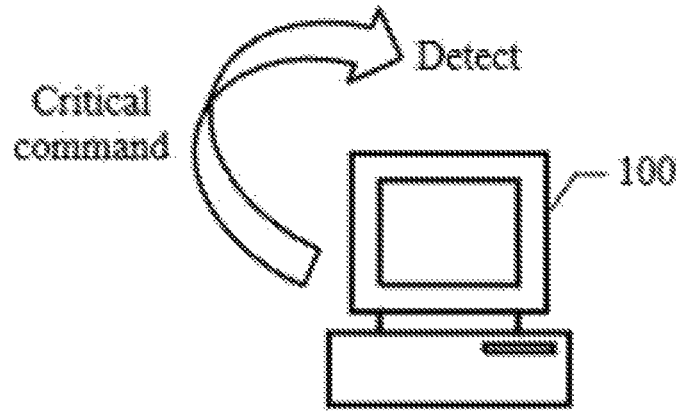
FIG. 1A-FIG. 1D show the general principles of the solution according to an embodiment of the present disclosure.

Starting from FIG. 1A, commands are continuously submitted to a computing environment 100 (such as a virtual machine or a container) during its operation, for example, by a user thereof. Some of the commands are critical, because they may (potentially) impact operation of the computing environment 100 (for example, when involving deletion of files, modification of configuration parameters and so on). Each critical command is detected before it is applied to the computing environment 100 (for example, by monitoring all the commands that are submitted and identifying the critical ones among them).

Figure 1B:
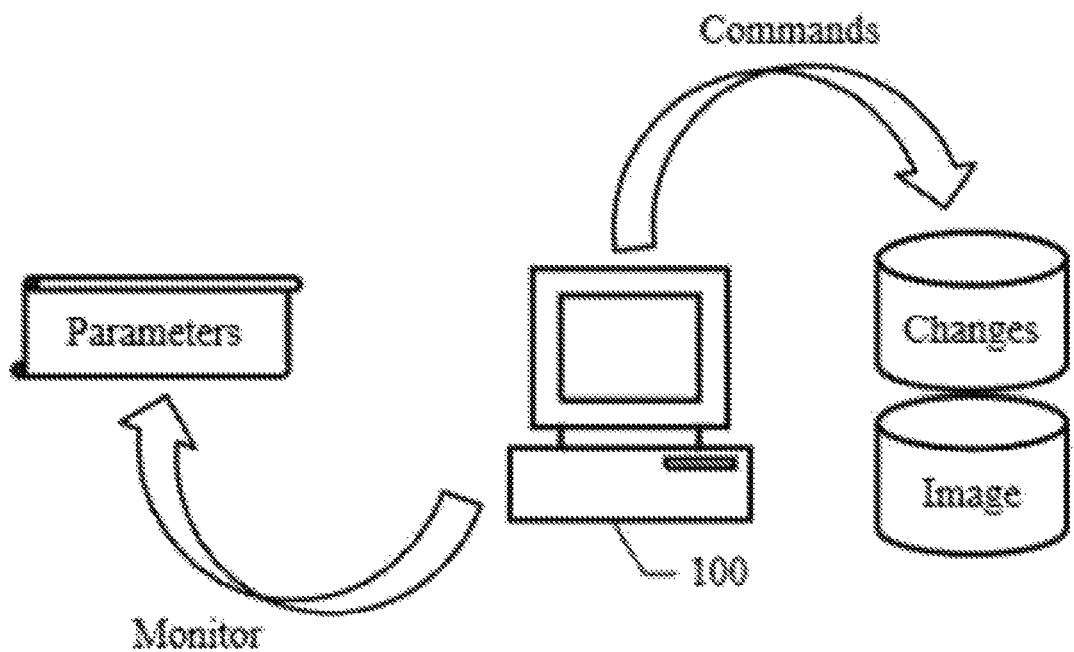

Moving to FIG. 1B, whenever a critical command is detected, the critical command and possible following commands (submitted after the critical command) are applied to the computing environment 100 ephemerally. This means that an unchanged (information) image of the computing environment 100 (at the submission of the critical command) is maintained; nevertheless, any (information) changes caused by these (critical/following) commands are applied in real-time so that the computing environment 100 evolves dynamically seamlessly (with its user that works on a completely up-to-date version of the computing environment 100). For example, this result may be achieved with a redirect-on-write technique, wherein the information changes are applied to copies of corresponding information resources. At the same time, one or more operative parameters of the computing environment 100 are monitored after the application of the critical command (for example, relating to resource usage, memory structure metadata, event messages and so on).

Figure 1C:
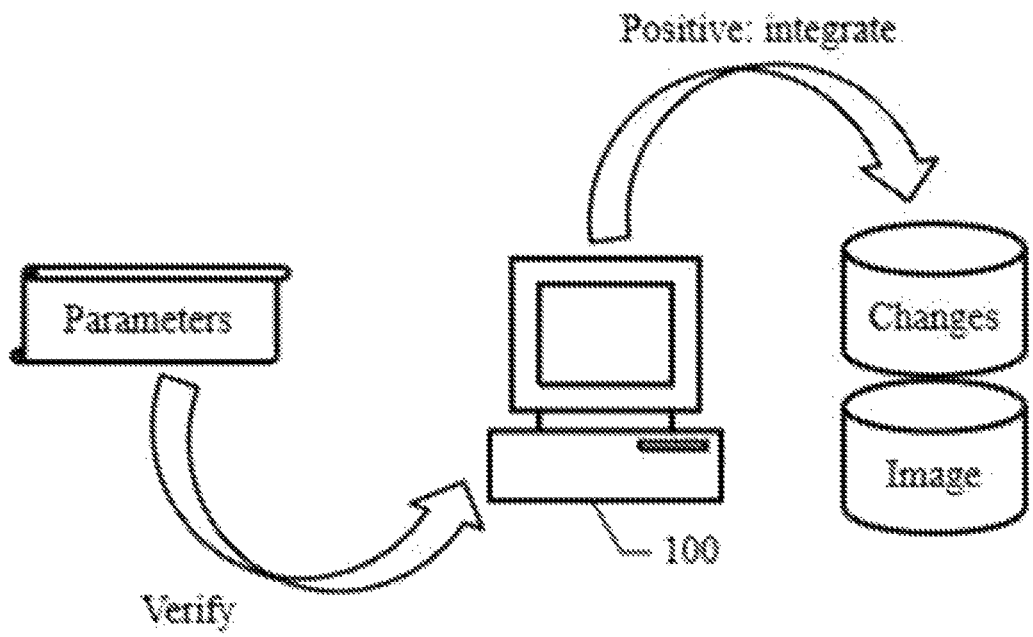

Moving to FIG. 1C, a (command) effect of the application of the critical command on the computing environment 100 is verified according to the operative parameters (for example, by comparing monitored values thereof with reference values defining a good status of the computing environment 100). In case of a positive result of the verification of the command effect, this means that the critical command should have not caused any problem to the computing environment 100. Therefore, the application of the critical command and of the following commands, i.e., the information changes caused by them, are integrated into the computing environment 100 (by merging the information changes into the information image in case of the redirect-on-copy technique).

Figure 1D:
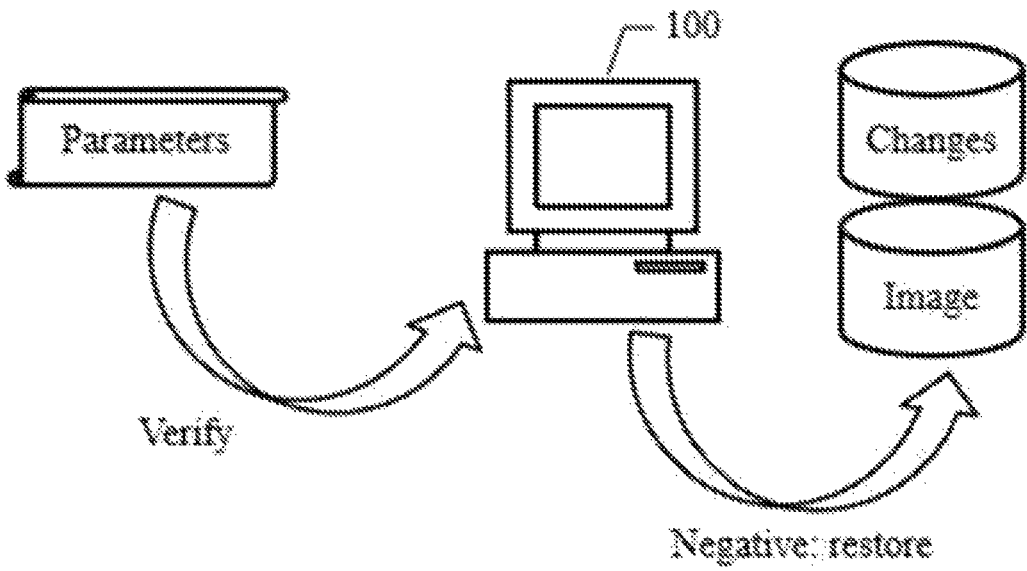

Moving to FIG. 1D, in case of a negative result of the verification of the command effect, instead, this means that the critical command is likely to have caused problems to the computing environment 100. Therefore, appropriate correction actions are taken to avoid compromising operation of the computing environment 100. For example, the information image of the computing environment 100, before the application of the critical command, is restored (by discarding the information changes in case of the redirect-on-copy technique).

The above described solution avoids (or at least substantially reduces) the risks of compromising the operation of the computing environment in case of problems caused by the information changes (and then the consequent downtime of the computing environment and the possible loss of data).

This solution is very effective. Indeed, the critical commands that might impact operation of the computing environment are detected automatically; moreover, their effect is verified in real-time in the actual production environment of the computing environment.

Particularly, the proposed solution is effective in all situations; this is especially useful when problems are caused by actions (having unexpected side effects) that are performed during normal operation of the computing environment (for example, commands submitted by error or because of wrong evaluations).

Figure 2:
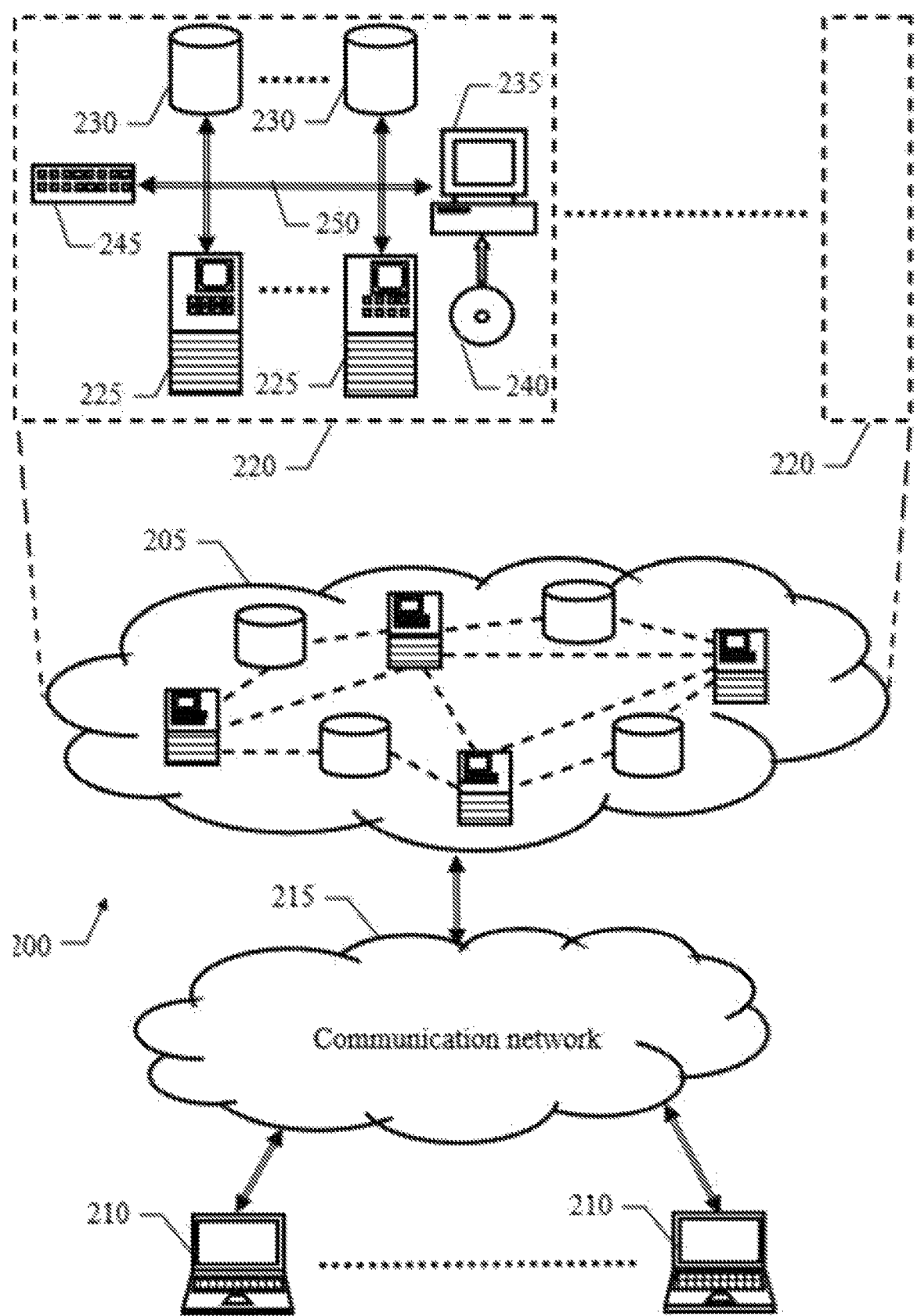
FIG. 2 shows a schematic block diagram of a computing infrastructure wherein the solution according to an embodiment of the present disclosure may be practiced.

With reference now to FIG. 2, a schematic block diagram is shown of a computing infrastructure 200 wherein the solution according to an embodiment of the present disclosure may be practiced.

The computing infrastructure 200 comprises one or more cloud providers 205 (only one shown in the figure). Each cloud provider 205 is an entity that provides a pool of computing resources as cloud services (i.e., shared computing resources that may be provisioned, configured and released very rapidly); the computing resources of the cloud services (generally of the virtual type, i.e., emulations by software of physical computing resources) are provided upon request to users of the cloud provider 205, so that each user has the sole control of these computing resources (which may then be used exactly as if they were dedicated physical computing resources). The cloud services may be provided according to several service models, particularly, Infrastructure as a Service (IaaS), Platform as a Service (PaaS), Software as a Service (SaaS) and Network as a Service (NaaS). Moreover, the cloud services may be provided according to different deployment models, particularly, public cloud (i.e., for the general public), private cloud (i.e., for a single organization), community cloud (i.e., for several organizations) or hybrid cloud (based on a combination of different deployment models).

The users connect to the cloud provider 205 with corresponding client computing machines, or simply clients, 210 (for example, of the thin type) via a (communication) network 215; for example, the network 215 may be the Internet for a public/community cloud or a LAN for a private cloud. For this purpose, the cloud provider 205 exposes a front-end component for accessing it (for example, via web browsers of the clients 210); the front-end component interfaces with a back-end component actually implementing the cloud services (which back-end component is not accessible from the outside, so that the users are completely agnostic about its location and configuration).

The cloud provider 205 is implemented in one or more server farms 220. Each server farm 220 comprises multiple server computing machines, or simply servers, 225 (for example, of the rack or blade type) and multiple storage disks 230 (for example, of the RAID type) implementing mass-memories thereof; in turn, each server 225 comprises (not shown in the figure) one or more microprocessors (μP) providing a logic capability of the server 225, a non-volatile memory (ROM) storing basic code for a bootstrap of the server 225 and a volatile memory (RAM) used as a working memory by the microprocessors. The server farm 220 also comprises a console 235 for controlling it (for example, a personal computer, also provided with a drive for reading/writing removable storage units 240, such as optical disks like DVDs). A switch/router sub-system 245 manages any communications among the servers 225, the disks 230 and the console 235, and with the network 215; for this purpose, the servers 225, the disks 230 and the console 235 are connected to the switch/router sub-system 245 (via corresponding network adapters) by means of a cabling sub-system 250.

Figure 3:
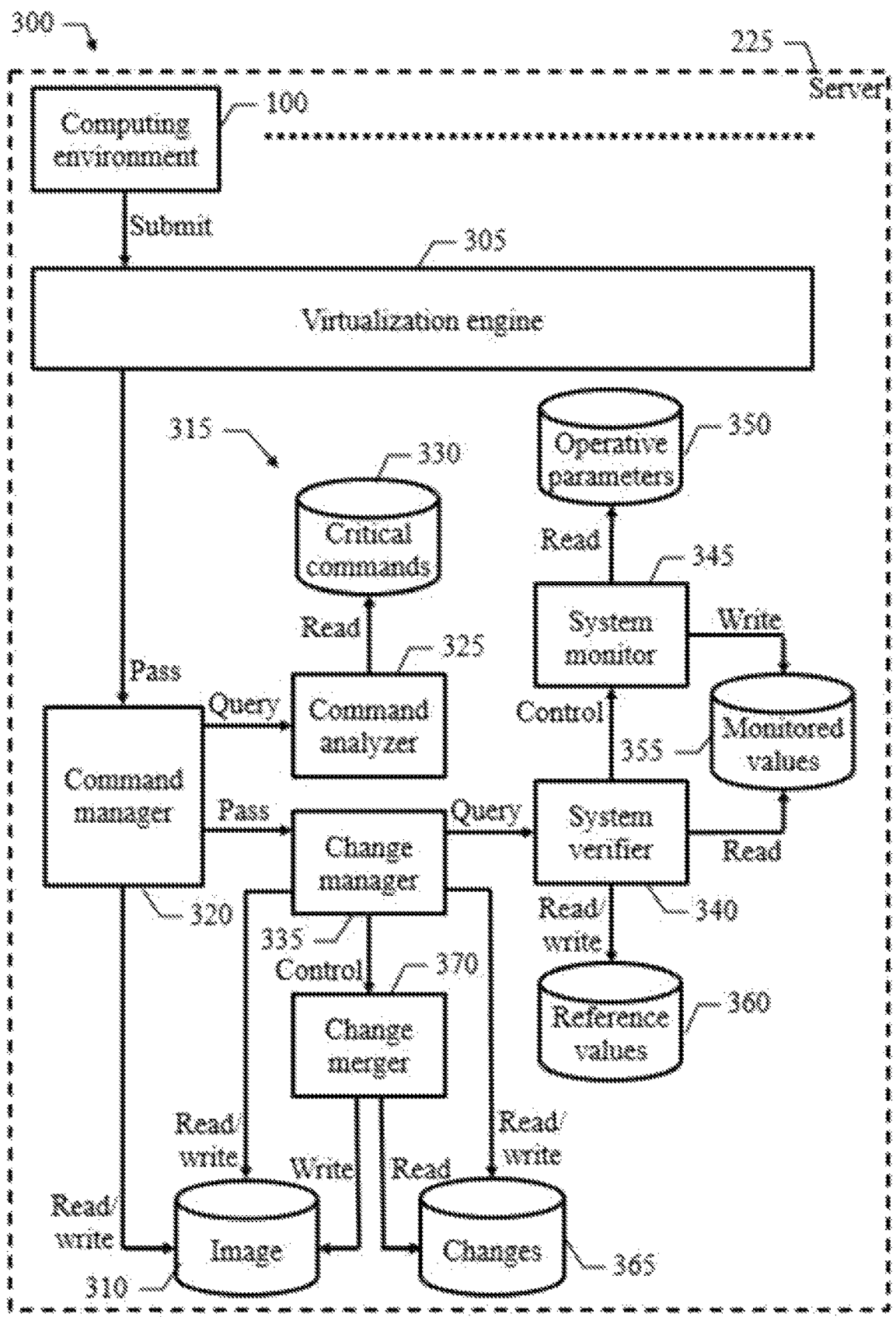
FIG. 3 shows the main software components that may be used to implement the solution according to an embodiment of the present disclosure.

With reference now to FIG. 3, the main software components are shown that may be used to implement the solution according to an embodiment of the present disclosure.

Particularly, all the software components (programs and data) are denoted as a whole with the reference 300. The software components 300 are typically stored in the mass memories and loaded (at least in part) into the working memories of the servers 225 (only one shown in the figure) when the programs are running. The programs are installed into the mass memories, for example, by reading from removable storage units and/or downloading from the network. In this respect, each program may be a module, segment or portion of code, which comprises one or more executable instructions for implementing the specified logical function.

The server 225 hosts one or more virtual computing environments (emulating physical computing environments), which implement corresponding instances of the above-mentioned computing environment 100. For this purpose, the (hosting) server 225 runs a virtualization engine 305, mapping (virtual) resources of the computing environments 100 to corresponding physical resources of the server 225 (i.e., processing capability, working memory, mass-memory, network functionalities and so on). The computing environments 100 may be Virtual Machines (VMs), each emulating a whole physical computing machine with a full copy of an operating system and of one or more software applications running on top of it; alternatively, the computing environments 100 may be containers (also known as zones or private servers), each emulating an (isolated) application environment running on a (shared) operating system (exploiting resource isolation features provided by it). An information image 310 is provided for each computing environment 100; the information image 310 stores information (programs and data) of the computing environment 100, emulating a file system thereof.

In the solution according to an embodiment of the present disclosure, the server 225 further comprises the following software components. For example, these software components define an abstraction utility 315 that is registered with the virtualization engine 305 as a custom memory driver for managing a storage facility of the computing environments 100.

A command manager 320 manages any (access) commands that are submitted in each computing environment 100 for accessing (changing and/or inspecting) its information. The command manager 320 intercepts the commands, for example, thanks to the virtualization engine 305 that passes the commands submitted thereto by the computing environment 100 to the command manager 320. The command manager 320 queries a command analyzer 325. The command analyzer 325 analyzes the commands to detect any critical commands among them. The command analyzer 325 accesses (in read mode) a critical commands repository 330. The critical commands repository 320 lists the critical commands (which may potentially impact operation of the computing environment 100); for example, the critical commands are the ones relating to deletion of files, writing of files, updating of file properties, modification of system settings, modification of application parameters and so on. The command manager 320 accesses (in read/write mode) the information image 310 (to apply the commands during its normal operation). Alternatively, the command manager 320 passes the commands to a change manager 335. The change manager 335 manages (information) changes to the information of the computing environment 100 during verification of (command) effects of the critical commands on the computing environment 100. The change manager 335 queries a system verifier 340. The system verifier 340 verifies the command effects. The system verifier 340 controls a system monitor 345. The system monitor 345 monitors one or more operative parameters of the computing environment 100. The system monitor 345 accesses (in read mode) an operative parameters repository 350. The operative parameters repository 350 lists the operative parameters to be monitored. The operative parameters provides valuable information about a status of the computing environment 100. For example, the operative parameters indicate usage of (virtual) resources of the computing environment 100, such as processing capability usage (like percentage of microprocessors' capability, processed transactions per seconds and so on), memory space usage (like working memory usage, mass-memory usage and so on), network usage (like traffic, bandwidth and so on) and the like, memory structure metadata (such as file permissions, visibility and so on), event messages (such as logged errors, warnings and so on) and similar ones. The system monitor 345 further accesses (in write mode) a monitored values repository 355. The monitored values repository 355 contains the (monitored) values that have been monitored of the operative parameters (during the verification of each command effect). For example, the monitored values repository 355 comprises an entry for each operative parameter; the entry stores one or more monitored values of the operative parameter that have been collected over time. The system verifier 340 accesses (in read mode) the monitored values repository 355 and it accesses (in read/write mode) a reference values repository 360. The reference values repository 360 contains reference values relating to the operative parameters, which define a good status of the computing environment 100. For example, the reference values express a reference meta model of the computing environment 100 in terms of acceptable values of the resource usage, correct values of the memory structure metadata, unacceptable event messages and so on. The change manager 335 further accesses (in read/write mode) the information image 310 and an information changes repository 365 (to apply the commands with a redirect-on-write technique during the verification of each command effect). The information changes repository 365 contains the information changes that have been applied to the information of the computing environment 100 (by any critical command and its following commands). For example, the information changes repository 365 comprises an entry for each (virtual) information resource of the computing environment 100 that has been changed (such as a file, a data base, a parameter, a setting and so on); the entry stores the (current) last version of the information resource. The change manager 335 controls a change merger 370. The change merger 370 merges the information changes into the information image. The change merger 370 accesses (in read mode) the information changes repository 365 and it accesses (in write mode) the information image 310.

The above-described implementation of the solution according to an embodiment of the present disclosure does not require any modification to the computing environments 100; therefore, this implementation is of general and easy applicability (especially in cloud environments).

Figure 4:
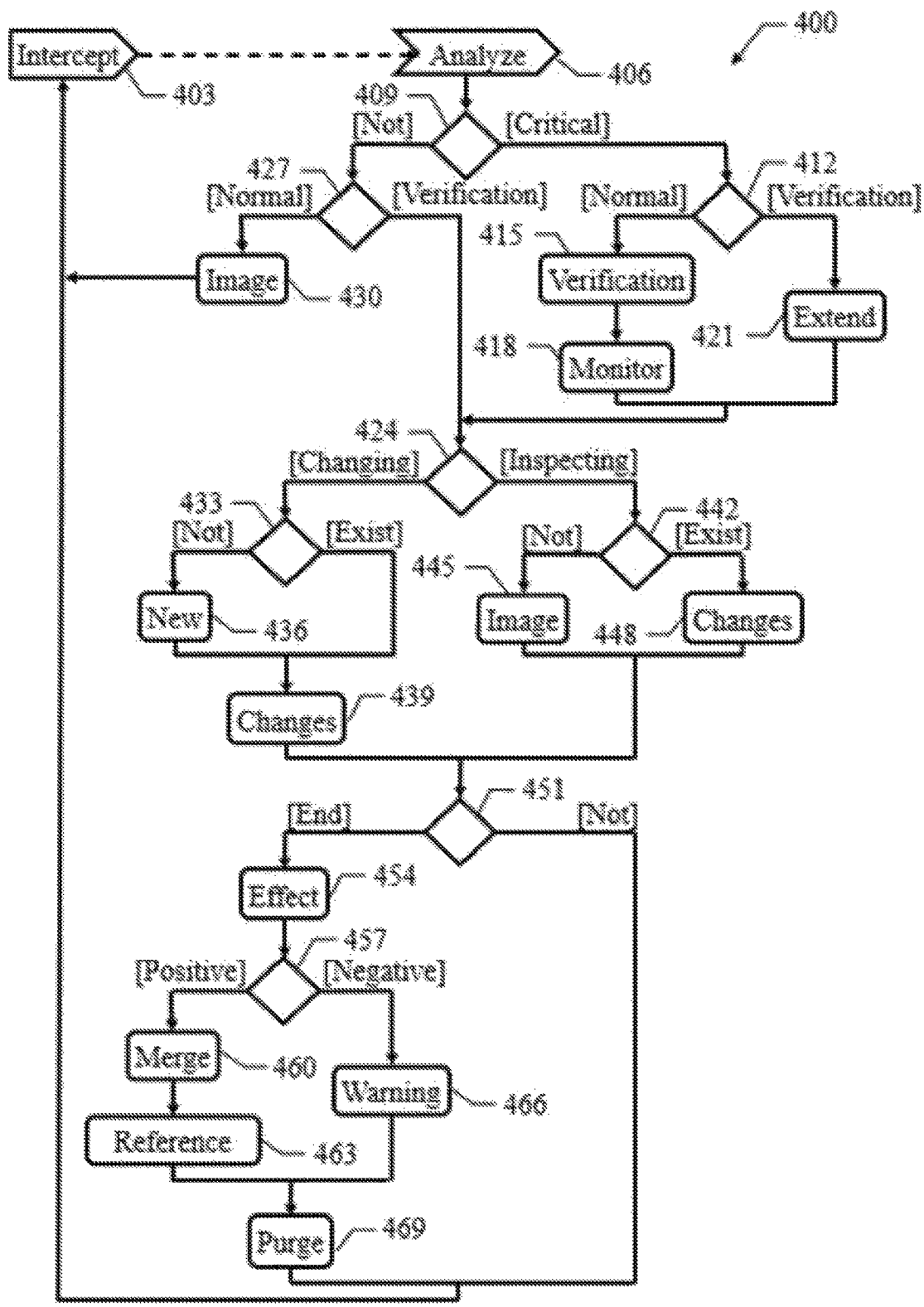
FIG. 4 shows an activity diagram describing the flow of activities relating to an implementation of the solution according to an embodiment of the present disclosure.

With reference now to FIG. 4, an activity diagram is shown describing the flow of activities relating to an implementation of the solution according to an embodiment of the present disclosure.

Particularly, the activity diagram represents an exemplary process that may be used to manage a generic computing environment (to verify the effects of commands applied thereto) with a method 400. In this respect, each block may correspond to one or more executable instructions for implementing the specified logical function on each workstation.

The abstraction utility continually performs an (endless) loop. Particularly, the process passes from block 403 to block 406 whenever the command manager intercepts any (access) command submitted in the computing environment (as passed thereto by the virtualization engine receiving it). In response thereto, command analyzer looks for the command in the list of critical commands (retrieved from the corresponding repository). The flow of activity branches at block 409 according to a result of this operation. If the command is comprised in the list of critical commands (meaning that it is so), the process continues to block 412. At this point, the command manager verifies an operative mode thereof (for example, indicated by a corresponding mode flag). If the command manager is in a normal (operative) mode (for example, as indicated by the mode flag being deasserted, such as at the logic value 0), the command manager at block 415 enters a verification (operative) mode (by asserting the mode flag, such as to the logic value 1, in the example at issue); at the same time, the command manager initializes a verification counter defining a period of the verification mode (for example, by setting its starting time to the current time). The system monitor at block 418 starts monitoring the operative parameters (listed in the corresponding repository). For this purpose, the system monitor purges the monitored values repository and then collects the monitored values of the operative parameters and saves them into the corresponding entries thereof. For example, the operative parameters relating to resource usage are collected periodically (such as every 0.1-1 s), the operative parameters relating to memory structure metadata are collected whenever they are modified and the operative parameters relating to event messages are collected whenever they are logged (such as by polling log files of the operating system and of software applications, or by registering for notifications with corresponding services). Referring back to the block 412, if the command manager is already in the verification mode (as indicated by the mode flag being asserted in the example at issue), the command manager at block 421 continues the verification mode. For example, the command manager extends the period of the verification mode by resetting the verification counter (i.e., the starting time of the verification mode to the current time in the example at issue). The process then continues from either the block 418 or the block 421 to the block 424 (to apply the critical command ephemerally, as described in the following).

Returning to the block 409, if the command is not comprised in the list of critical commands (meaning that it is not so), the process continues to block 427. At this point, the command manager again verifies its operative mode. If the command manager is in the normal mode (as indicated by the mode flag being deasserted in the example at issue), the command manager at block 430 applies the command effectively to the information image as usual. The process then returns to the block 403 waiting for a next command. Referring back to the block 427, if the command manager is instead in the verification mode (as indicated by the mode flag being asserted in the example at issue), the process descends into the block 424 (to apply the command ephemerally).

With reference now to the block 424, the flow of activity branches according to the type of the command. Particularly, the command may be of a changing type or of an inspecting type. A command of the changing type involves a change to a corresponding information resource, for example, to its content, attributes, location and so on (such as writing, deleting, moving the information resource, updating its metadata and the like); conversely, a command of the inspecting type does not involve any change to the corresponding information resource (such as reading, querying, analyzing and so on). If the command is of the changing type, the change manager at block 433 verifies whether an entry for the information resource of the (changing) command exists in the information changes repository. If not, the change manager at block 436 creates a new entry for the information resource into the information changes repository (by copying it from the information image). The process then descends into block 439; the same point is also reached directly from the block 433 if the entry for the information resource already exists in the information changes repository. At this point, the change manager applies the changing command to the information changes repository, thereby changing the information resource in it; in this way, the information changes repository stores the last version of the information resource (whereas it remains unchanged, at the time of entering the verification mode, in the information image). Referring back to the block 430, if the command is of the inspecting type the change manager at block 442 again verifies whether an entry for the information resource of the (inspecting) command exists in the information changes repository. If not, the change manager at block 445 applies the inspecting command to the information image, thereby retrieving (the unique version of) the information resource from it. Conversely, if the entry for the information resource exists in the information changes repository, the change manager at block 448 applies the inspecting command to the information changes repository, thereby retrieving (the last version of) the information resource from it.

The flow of activity now merges at block 451 from the block 439, the block 445 or the block 448. At this point, the command manager verifies whether the verification mode has ended; this happens when the period of the verification mode has been completed, as indicated by the verification counter that has reached a pre-defined value, such as 10-120 s (i.e., with a difference between the current time and the starting time of the verification mode that is, possibly strictly, higher than it in the example at issue). If the verification mode has ended, the system verifier at block 454 verifies the corresponding command effect (of the application of the critical command(s) during the verification mode to the computing environment). For this purpose, the system verifier determines a status of the computing environment during the verification mode according to the monitored values of the operative parameters (retrieved from the corresponding repository); for example, the status is defined by a consolidated value of the monitored values of each operative parameter relating to resource usage (such as their mean value), the possible modified values of the memory structure metadata and the possible logged event messages. The system verifier then verifies the status of the computing environment against the reference meta model defined by the reference values (retrieved from the corresponding repository); for example, the status is deemed good when the consolidated value of each operative parameter relating to resource usage is within its acceptable value, the modified values of the memory structure metadata meet their correct values and the logged event messages are different from the unacceptable ones, whereas the status is deemed bad otherwise. If the system verifier has determined that the status of the computing environment is good, this means that the result of the verification of the command effect is positive (since the critical command should have not caused any problem to the computing environment). In this case, the change manager at block 460 accepts the information changes (applied to the information resources during the verification mode). For this purpose, the change merger merges the information changes into the information image. Particularly, for each entry of the information changes repository, the change merger copies the last version of the corresponding information resources stored therein into the information image. The system verifier at block 463 updates the reference values according to the monitored values (defining a new baseline for the good status of the computing environment). For example, the acceptable value of each operative parameter relating to resource usage is updated according to the corresponding consolidated value (such as by a percentage of their difference, like 10-20%). In this way, the reference meta model of the computing environment self-adapts dynamically to its evolution over time. With reference back to the block 457, if the system verifier has determined that the status of the computing environment is bad, this means that the result of the verification of the command effect is negative (since the critical command is likely to have caused problems to the computing environment). In this case, the change manager at block 466 rejects the information changes (applied to the information resources during the verification mode). For this purpose, no action is performed on the information image (so as to leave its unchanged); the change manager at block 466 instead sends a corresponding warning message to the user, informing him/her of the problems caused by the critical command; in this way, the user may apply corrective actions easily and quickly. The flow of activity merges again at block 469 from either the block 463 or the block 466. In both cases, the change manger purges the information changes (by resetting the corresponding repository); as a result, the information changes are automatically lost in case of negative result of the verification of the command effect. Moreover, the command manager switches back to the normal mode (by deasserting the verification flag in the example at issue). The process then returns to the block 403 waiting for a next command.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for managing a computing environment. However, the computing environment may be of any type (for example, virtual, physical and so on).

In an embodiment, the method comprises the following steps under the control of a managing system. However, the managing system may be of any type (for example, a hosting computing system emulating the virtual computing environment, the (virtual/physical) computing environment itself and so on).

In an embodiment, the method comprises detecting (by the managing system) critical one or more of commands submitted to the computing environment. However, the critical commands may be in any number, submitted in any way (for example, by a user, a local software program, a remote command and so on) and detected in any way (for example, passed by a target module to which they are submitted, such as a virtualization engine or an operating system, intercepted by wrapping the target module, using hooking techniques and so on).

In an embodiment, the critical commands potentially impact operation of the computing environment. However, the critical commands may be of any type (for example, determined according to their category, to their parameters, such as defining the information resources to which they are applied and/or the performed actions, and so on).

In an embodiment, the method comprises applying (by the managing system in response to the detection of each of the critical commands) the critical command and possible following ones of the commands submitted to the computing environment after the submission of the critical command ephemerally to the computing environment by maintaining an unchanged image of the computing environment corresponding to the submission of the critical command. However, the critical/following commands may be applied ephemerally in any way. For example, this result may be achieved with the above-described redirect-on-write technique. Alternatively, it is possible to use a copy-on-write technique (wherein the changes are applied to the information image after making a copy of the information resources before their first change), a fat-nodes technique (wherein all the changed versions of each information resource, or at least the last one, are recorded in the information resource itself in addition to its original version) and so on.

In an embodiment, the method comprises monitoring (by the managing system) one or more operative parameters of the computing environment in response to the application of the critical command. However, the operative parameters may be in any number and of any type (for example, relating to resource usage, memory structure metadata, event messages, performance, any combination thereof and so on); the operative parameters may be monitored in any way (for example, with polling techniques, registering for corresponding notifications, their combination, and so on).

In an embodiment, the method comprises verifying (by the managing system) a command effect of the application of the critical command on the computing environment according to the operative parameters. However, the command effect may be determined in any way (for example, based on consolidated values of monitored values of each operative parameter, all the monitored values of each operative parameter, combinations of the monitored/consolidated values of multiple operative parameters, any combination thereof, and so on); the command effect may be verified in any way (for example, by using reference values, classification algorithms, machine learning techniques and so on) and at any time (for example, after the completion of a verification period from the application of the critical command, repeatedly for a certain number of times, and so on).

In an embodiment, the method comprises integrating (by the managing system in response to a positive result of the verification of the command effect) the application of the critical command and of the following commands effectively into the computing environment. However, the integration may be performed in any way (for example, by merging the information changes into the information image in case of the redirect-on-write technique, by discarding the copies of the information resources in case of the copy-on-write technique, by collapsing the information resources into their last version in case of the fat-nodes technique and so on); the positive result of the command verification may be determined in any way (for example, when each operative parameter met a corresponding condition, when one or more combinations of the operative parameters met corresponding conditions, and so on).

Further embodiments provide additional advantageous features, which may however be omitted at all in a basic implementation.

Particularly, in an embodiment the method comprises restoring (by the managing system in response to a negative result of the verification of the command effect) the unchanged image of the computing environment. However, the restoring may be performed in any way (for example, by discarding the information changes in case of the redirect-on-write technique, by merging the copies of the information resources into the information image in case of the copy-on-write technique, by removing the changed versions of the information resources in case of the fat-nodes technique and so on); the operation may be performed always (automatically, with or without any warning message), only after a user confirmation, and so on.

In an embodiment, the method comprises resuming (by the managing system) the application of the commands effectively to the computing environment in response to the integration of the application of the critical command and of the following commands. However, the resuming may be not performed when the integration is followed by another critical command, it may be delayed when additional critical commands are applied during the verification of the command effect, it may be performed in a similar way in response to the restoring of the unchanged image and so on.

In an embodiment, the method comprises applying (by the managing system in response to the detection of each of the critical commands) the critical command and the following commands ephemerally during a verification period following the submission of the critical command. However, the verification period may be of any time (for example, with a pre-defined duration, defined by a pre-defined number of commands and so on); moreover, in case of a further critical command during the verification period it is possible to extend it, to start a further verification period for the further critical command and so on.

In an embodiment, the method comprises monitoring (by the managing system) the operative parameters during the verification period. However, the operative parameters may be monitored in any way during the verification period (for example, continually, in response to the occurrence of specific events, at the end, any combination thereof and so on).

In an embodiment, the method comprises verifying (by the managing system) the command effect in response to a completion of the verification period. However, the command effect may be verified in any way in response to the completion of the verification period (for example, according to a status of the computing environment throughout and/or at the end of the verification period, a trend of the status during the verification period and so on); moreover, in case of a further critical command during the verification period it is possible to verify the command effect cumulatively at the completion of the extended verification period, to verify the command effects of the critical command and of the further critical command separately, and so on.

In an embodiment, the computing environment is a virtual computing environment emulated on a hosting computing system implementing the managing system. However, the virtual computing environment may be of any type (for example, a virtual machine, a container, a para-virtual machine and so on).

In an embodiment, the virtual computing environment is a virtual machine emulating a physical computing machine. However, the virtual machine may be of any type (for example, stand-alone, part of a virtual appliance, implemented by a hypervisor or an operating system, and so on).

In an embodiment, the virtual computing environment is a container emulating an isolated application environment sharing an operating system. However, the container may be of any type (for example, with a fully-dedicated information image, with an information image formed by a read-only layer from which multiple containers are instantiated and a read-write layer dedicated to the container with a redirect-on-write technique, with resource allocation that is indiscriminate, limited or per-quotas, with or without network isolation, with or without administrative privileges and so on).

In an embodiment, the method comprises applying (by the managing system) the critical command and the following commands ephemerally to the computing environment by, for any change operations of the critical command and of the following commands on corresponding information resources of the computing environment, applying the change operations to corresponding copies of the information resources. However, the change operations may be of any type and relating to any information resources (for example, partial, different or additional change operations and information resources with respect to the ones mentioned above).

In an embodiment, the method comprises integrating (by the managing system in response to the positive result of the verification of the command effect) the application of the critical command and of the following commands effectively into the computing environment by merging the copies of the information resources into the unchanged image. However, the merging may be performed in any way (for example, with or without saving the original version of the information resources contained in the unchanged image, and so on).

In an embodiment, the method comprises restoring (by the managing system in response to the negative result of the verification of the command effect) the unchanged image of the computing environment by discarding the copies of the computing resources. However, the copies may be discharged in any way (for example, with or without saving them or a corresponding log for off-line analysis, and so on).

In an embodiment, the method comprises monitoring (by the managing system) the commands submitted to the computing environment. However, the commands may be monitored in any way (for example, always for all the commands, only for the access (changing/inspecting) commands, only for the changing commands in the normal operative mode and for all the commands (or all the access commands) in the verification operative mode, and so on).

In an embodiment, the method comprises detecting (by the managing system) the critical commands among the commands being monitored according to one or more detection policies. However, the detection policies may be in any number and of any type (for example, a list of critical commands, rules based on categories/parameters of the commands and so on).

In an embodiment, the method comprises verifying (by the managing system) the command effect according to a comparison of monitored values of the operative parameters with one or more reference values. However, the reference values may be in any number (for example, one or more for each operative parameter, one or more for each combination of two or more operative parameters, and so on) and of any type (for example, single values, lists of values, ranges of values, indicative of maximum values, minimum values, correct values, unacceptable values and so on); the monitored values may be compared with the reference values in any way (for example, by comparing a monitored value, a consolidated value of an operative parameter, such as mean, median, mode, maximum, minimum and the like of its monitored values, a combined value based on the monitored/consolidated values of two or more operative parameters and similar with a corresponding reference value, any combination thereof, and so on).

In an embodiment, the method comprises updating (by the managing system in response to the positive result of the verification of the command effect) the reference values according to the monitored values. However, the reference values may be updated in any way according to the operative parameters (for example, incrementally, directly, automatically, requiring a manual confirmation, for all the reference values or only for part of them, such as the ones defined by metrics, and so on); more generally, the reference values may be updated manually or even be fixed (with the possibility of updating them only centrally).

In an embodiment, the operative parameters are indicative of resource usage, memory structure metadata and/or event messages associated with the computing environment. However, the operative parameter relating to resource usage, memory structure metadata and event messages may be of any type (for example, partial, different or additional operative parameters with respect to the ones mentioned above).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a computing system to perform the above-mentioned method. An embodiment provides a computer program product, which comprises a computer readable storage medium that has program instructions embodied therewith; the program instructions are executable by a computing system to cause the computing system to perform the same method. However, the computer program may be implemented as a stand-alone module, as a plug-in for a pre-existing software program (for example, a virtualization engine, an operative system and so on) or directly therein. Moreover, the computer program may be executed on any computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means that are configured for performing the steps of the above-described method. An embodiment provides a system comprising a circuit (i.e., any hardware suitably configured, for example, by software) for performing each step of the above-described method. However, the system may be of any type (for example, a server of a cloud environment, a computer of a client/server architecture, a stand-alone computer and so on).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing status information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device for a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing a computing environment, the method comprises:
   - detecting, by a managing system, one or more of critical commands submitted to the computing environment, the critical commands potentially impacting operation of the computing environment;
   - applying, by the managing system in response to the detection of each of the one or more critical commands, the one or more critical commands submitted to the computing environment after the submission of the critical command ephemerally to the computing environment by maintaining an unchanged image of the computing environment corresponding to the submission of the critical command;
   - monitoring, by the managing system, one or more operative parameters of the computing environment in response to the application of the critical command;
   - verifying, by the managing system, a command effect of the application of the critical command on the computing environment according to the operative parameters; and
   - integrating, by the managing system in response to a positive result of the verification of the command effect, the application of the critical command and of the following commands effectively into the computing environment.

2. The method according to claim 1, further comprising:
   - restoring, by the managing system in response to a negative result of the verification of the command effect, the unchanged image of the computing environment.

3. The method according to claim 1, further comprising:
   - resuming, by the managing system, the application of the commands effectively to the computing environment in response to the integration of the application of the one or more critical commands.

4. The method according to claim 1, further comprising:
   - applying, by the managing system in response to the detection of each of the critical commands, the critical command and the following commands ephemerally during a verification period following the submission of the critical command;
   - monitoring, by the managing system, the operative parameters during the verification period; and
   - verifying, by the managing system, the command effect in response to a completion of the verification period.

5. The method according to claim 1, wherein the computing environment is a virtual computing environment emulated on a hosting computing system implementing the managing system.

6. The method according to claim 5, wherein the virtual computing environment is a virtual machine emulating a physical computing machine.

7. The method according to claim 5, wherein the virtual computing environment is a container emulating an isolated application environment sharing an operating system.

8. The method according to claim 1, further comprising:
   - applying, by the managing system, the critical command and the following commands ephemerally to the computing environment by, for any change operations of the critical command and of the following commands on corresponding information resources of the computing environment, applying the change operations to corresponding copies of the information resources; and
   - integrating, by the managing system in response to the positive result of the verification of the command effect, the application of the critical command and of the following commands effectively into the computing environment by merging the copies of the information resources into the unchanged image.

9. The method according to claim 8, further comprising:
   - restoring, by the managing system in response to a negative result of the verification of the command effect, the unchanged image of the computing environment by discarding the copies of the information resources.

10. The method according to claim 1, further comprising:
    - monitoring, by the managing system, the commands submitted to the computing environment; and
    - detecting, by the managing system, the critical commands among the commands being monitored according to one or more detection policies.

11. The method according to claim 1, further comprising:
    - verifying, by the managing system, the command effect according to a comparison of monitored values of the operative parameters with one or more reference values.

12. The method according to claim 11, further comprising:
    - updating, by the managing system in response to the positive result of the verification of the command effect, the reference values according to the monitored values.

13. The method according to claim 1, wherein the operative parameters are indicative of resource usage, memory structure metadata and/or event messages associated with the computing environment.

14. A computer program product for managing a computing environment, the computer program product comprising a computer readable storage medium having program instructions embodied therewith, the program instructions being executable by a computing system to cause the computing system to perform a method comprising:
    - detecting one or more of critical commands submitted to the computing environment, the critical commands potentially impacting operation of the computing environment;
    - applying, in response to the detection of each of the one or more critical commands, the one or more critical commands submitted to the computing environment after the submission of the critical command ephemerally to the computing environment by maintaining an unchanged image of the computing environment corresponding to the submission of the critical command;
    - monitoring one or more operative parameters of the computing environment in response to the application of the critical command;
    - verifying a command effect of the application of the critical command on the computing environment according to the operative parameters; and
    - integrating, in response to a positive result of the verification of the command effect, the application of the critical command and of the following commands effectively into the computing environment.

15. The computer program product according to claim 14, further comprising:
    - restoring, in response to a negative result of the verification of the command effect, the unchanged image of the computing environment.

16. The computer program product according to claim 14, further comprising:

resuming the application of the commands effectively to the computing environment in response to the integration of the application of the one or more critical commands.

17. The computer program product according to claim 14, further comprising:
    applying, in response to the detection of each of the critical commands, the critical command and the following commands ephemerally during a verification period following the submission of the critical command;
    monitoring the operative parameters during the verification period; and
    verifying the command effect in response to a completion of the verification period.

18. The computer program product according to claim 14, wherein the computing environment is a virtual computing environment emulated on a hosting computing system implementing the managing system.

19. The computer program product according to claim 18, wherein the virtual computing environment is a virtual machine emulating a physical computing machine.

20. A system for managing a computing environment, the system comprising:
    a command manager for detecting one or more of critical commands submitted to the computing environment, the critical commands potentially impacting operation of the computing environment;
    a change manager for applying, in response to the detection of each of the one or more critical commands, the one or more critical commands submitted to the computing environment after the submission of the critical command ephemerally to the computing environment by maintaining an unchanged image of the computing environment corresponding to the submission of the critical command;
    a system monitor for monitoring one or more operative parameters of the computing environment in response to the application of the critical command;
    a system verifier for verifying a command effect of the application of the critical command on the computing environment according to the operative parameters; and
    a change merger for integrating, in response to a positive result of the verification of the command effect, the application of the critical command and of the following commands effectively into the computing environment.

* * * * *